(12) United States Patent
Maryka et al.

(10) Patent No.: US 6,490,616 B1
(45) Date of Patent: Dec. 3, 2002

(54) METHOD AND APPARATUS FOR INCREMENTAL DOWNLOAD FROM SERVER TO CLIENT

(75) Inventors: Stephen Maryka, Calgary (CA); Bertrand Michaud, Calgary (CA); Greg Dick, Calgary (CA)

(73) Assignee: Wind River International, Ltd., Toronto (CA)

( * ) Notice: Subject to any disclaimer, the term of this patent is extended or adjusted under 35 U.S.C. 154(b) by 0 days.

(21) Appl. No.: 09/332,069

(22) Filed: Jun. 14, 1999

(51) Int. Cl.[7] .............................................. G06F 15/177
(52) U.S. Cl. ....................... 709/222; 709/213; 709/220; 709/221; 709/228; 713/1; 713/100; 370/229; 710/61
(58) Field of Search .................................. 709/213, 222, 709/228, 232, 221; 713/1, 100; 370/229; 710/61

(56) References Cited

U.S. PATENT DOCUMENTS

| 5,613,124 A | | 3/1997 | Atkinson et al. |
| 5,805,897 A | * | 9/1998 | Glowny ....................... 395/712 |
| 5,963,937 A | | 10/1999 | Yamasaki et al. |
| 5,974,461 A | * | 10/1999 | Goldman et al. ........... 709/224 |
| 6,023,268 A | * | 2/2000 | Britt, Jr. et al. ............. 345/327 |
| 6,049,892 A | * | 4/2000 | Casagrande et al. .......... 714/18 |
| 6,161,145 A | * | 12/2000 | Bainbridge et al. ......... 709/246 |
| 6,202,091 B1 | * | 3/2001 | Godse ......................... 709/222 |
| 6,230,211 B1 | * | 5/2001 | Britt, Jr. et al. .............. 717/11 |
| 6,237,039 B1 | * | 5/2001 | Perlman ...................... 709/237 |
| 6,247,126 B1 | * | 6/2001 | Beelitz et al. ................. 713/1 |

FOREIGN PATENT DOCUMENTS

| EP | 0 284 924 | 10/1988 |
| EP | 0 694 831 | 1/1996 |
| EP | 0 789 300 | 8/1997 |
| EP | 0 909 057 | 4/1999 |
| EP | 0 913 769 | 5/1999 |
| EP | 0 915 419 | 5/1999 |
| FR | A 2 667 419 | 4/1992 |
| GB | 2 266 172 | 10/1993 |
| GB | 2 311 390 | 9/1997 |
| JP | 02 005191 | 1/1990 |
| WO | WO 98 25239 | 6/1998 |

OTHER PUBLICATIONS

"Event Handling, Alarm Clock, and Monitoring Services," Sun Microsystems, Inc., 1998, pp. 1–25.
"JAVA Dynamic Management Kit," Sun Microsystems, Inc., 1998, pp. 1–2.

(List continued on next page.)

Primary Examiner—Saleh Najjar
(74) Attorney, Agent, or Firm—Fay Kaplun & Marcin LLP (57) ABSTRACT

A method and system for transferring objects between computers, especially a server and a device in a Java environment, is provided. A server connected to the device interrogates the device to determine whether the device has the available resources to accept a download, and to determine if any of objects included in the download are already resident on the device. Using a gateway object on the device, and a gateway managed-object on the server, the server passes an archive of the necessary objects, not presently available on the device, to the gateway via the gateway managed-object. The gateway then instructs a persistent storage repository on the device to commit the archive to persistent storage. A flag is set at the start of the archive-committing process, such that if the device loses power during the archive-committing process, upon re-initialization of the device, the device can determine that the archive-committing process failed and will instruct the persistent storage to free-up storage area used during the archive-committing process. The transferal of objects can then be recommenced once the server and device reestablish communication.

14 Claims, 7 Drawing Sheets

OTHER PUBLICATIONS

Sun Microsystems, Java Beans Version 1.01, Hamilton, G., 1996, Sun Microsystems, Mountainview, CA.

Java Dynamic Management Kit 3.0 Programming Guide, 1998 Sun Microsystems Inc.

* cited by examiner

METHOD AND APPARATUS FOR INCREMENTAL DOWNLOAD FROM SERVER TO CLIENT

FIELD OF THE INVENTION

The present invention relates generally to file transfers over a communication medium and more particularly relates to a method and system for transferring objects from one computer to another.

BACKGROUND OF THE INVENTION

The development of network computing ("NC") technology has spawned the development of several intelligent devices, ranging from simple thin-client desk-top computers, to internet-aware screen phones, mobile phones, personal digital assistants ("PDAs"), public kiosks, smart-card based banking devices, etc. The Java computer language has been an important feature of this technological development, as it provides a "Write Once, Run Anywhere" platform which is an effective way to transfer an application from a server to a device for local execution on the device. Thus, Java provides the ability to transparently deliver, via a communications mechanism such as a general purpose network or a special purpose communications port, software to a variety of devices having different hardware platforms and has become a standard language for internet applications.

Additional transfer functionality is provided in the more recent Java Dynamic Management Kit, and discussed in *Java Dynamic Management Kit 3.0 Programming Guide*, 1998 Sun Microsystems, Inc. 901 San Antonio Road, Palo Alto, Calif. 94303 U.S.A. ("JDMK").

While Java and the JDMK provide effective ways to pass or transfer a software application to a device, they do not provide solutions to certain problems that can arise with file transfers. For example, existing solutions do not provide a robust recovery mechanism once power is restored, should power to the device be interrupted during a transfer. Further, where the communication medium has reduced bandwidth, it can be desirable to only download the components of the application which are not already resident on the device. In addition, Java and the JDMK do not provide an infrastructure for managing the persistent storage of Java objects.

SUMMARY OF THE INVENTION

It is an object of the present invention to provide a novel method and system for transferring objects between computers which obviates or mitigates at least one of the disadvantages of the prior art.

The present invention provides a method and system for transferring objects between computers, especially a server and a device in a Java environment. A server connected to the device interrogates the device to determine whether the device has the available resources to accept a download, and to determine if any of objects included in the download are already resident on the device. Using a gateway object on the device, and a gateway managed-object on the server, the server passes an archive of the necessary objects, specifically those not presently available on the device, to the gateway via the gateway managed-object. The gateway then instructs a persistent storage repository on the device to commit the archive to persistent storage.

A flag is set at the start of the archive-committing process, such that if the device loses power during the archive-committing process, upon re-initialization of the device, the device can determine that the archive-committing process failed and will instruct the persistent storage to free-up storage area used during the archive-committing process. The transferal of objects can then be recommenced once the server and device reestablish communication.

The present invention can provide an effective means to ensure a stable recovery of the device upon re-initialization, should the file transfer and/or archive-commit process fail due to a power failure to the device. Further, the invention can increase efficient use of device resources by not loading redundant components on the device and can reduce bandwidth requirements and/or download times as redundant information is not transferred.

BRIEF DESCRIPTION OF THE DRAWINGS

The present invention will now be explained, by way of example only, with reference to certain embodiments and the attached Figures in which.

DETAILED DESCRIPTION OF THE INVENTION

Figure 1:
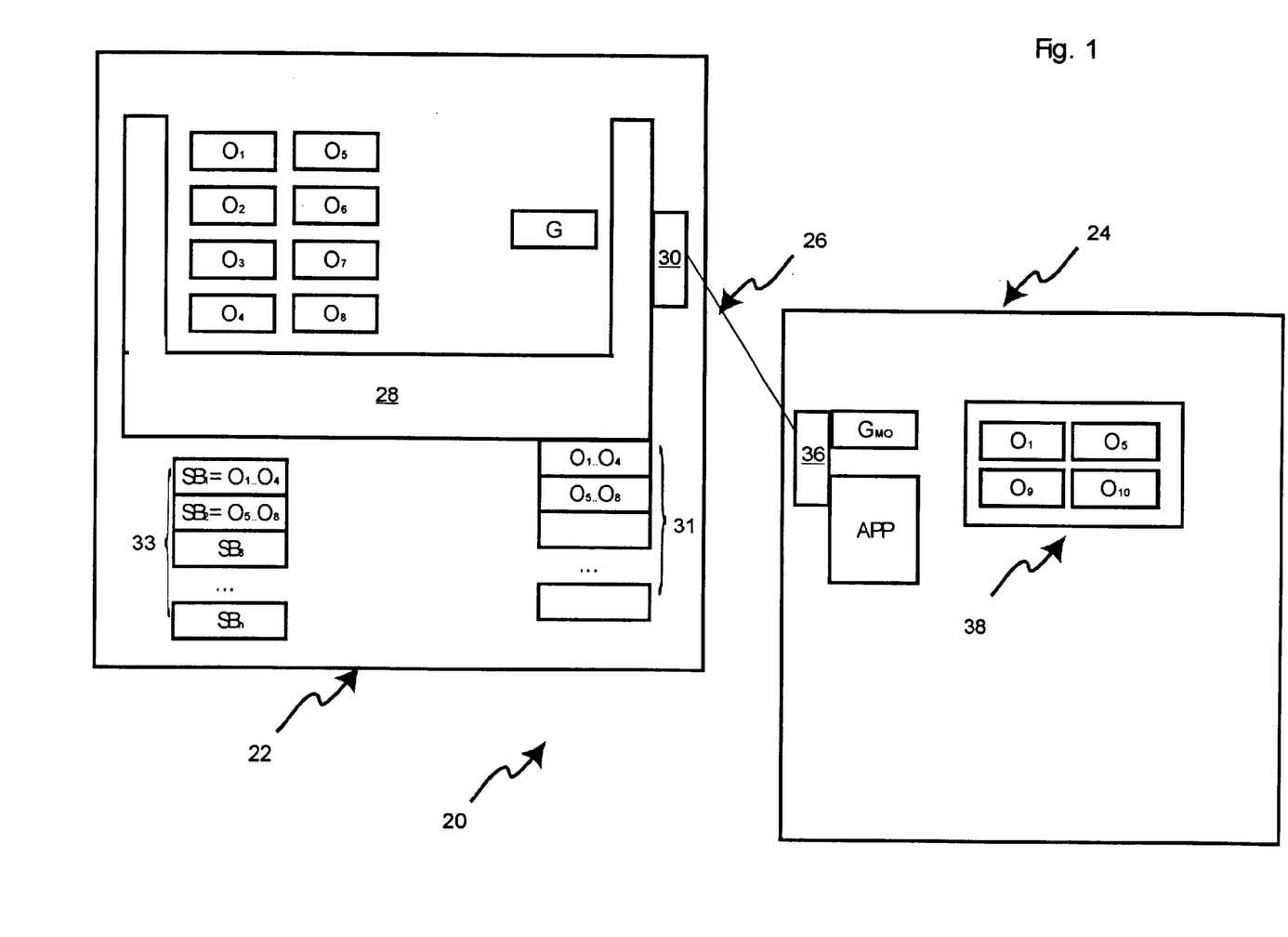
FIG. 1 is a schematic diagram of a system for transferring objects between two computers in accordance with an embodiment of the present invention.

Referring now to FIG. 1, a system for transferring objects between two computers is indicated generally at 20. System 20 includes two computers, a device 22 and a server 24. Device 22 is any intelligent device as will occur to those of skill in the art, and examples of such devices include a 'thin-client terminal', an internet-aware screen phone, mobile phone, personal digital assistant ("PDA"), public kiosk and/or smart-card based banking device, etc. and is operable to execute software applications created in a language such as Java.

In a present embodiment of the invention, device 22 is Java-based and has a basic set of hardware resources including a central processing unit (not shown), and a persistent storage means (not shown) such as EEPROM, flash memory, floppy disc etc. Device 22 further includes random access memory (not shown) and a communications means, such as a network interface card or other network interface means (not shown) to allow device 22 to communicate over a communication medium 26 such as the internet.

Server 24 is any suitable server, as will occur to those of skill in the art, such as the Sun Enterprise 450 server sold by Sun Microsystems of Palo Alto Calif., and is generally operable to function as a network computing server. In an embodiment of the invention, server 24 is Java-based and includes a central processing unit (not shown), random access memory (not shown), a data storage means 38, and a communications means, such as a network interface card or other network interface means (not shown) to allow server 24 to communicate over communication medium 26.

Software within device 22 includes a Java-based framework 28 that is associated with Java-based objects ($O_1$, $O_2 \ldots O_8$) which in a present embodiment are JavaBeans. Specifications for frameworks and JavaBean can be found in *Java Dynamic Management Kit 3.0 Programming Guide*, Chapter 10, 1998 Sun Microsystems, Inc. 901 San Antonio Road, Palo Alto, Calif. 94303 U.S.A. ("JDMK") and *Sun Microsystems, JavaBeans™*, Version 1.01, Hamilton, G., Editor, 1996, Sun Microsystems Inc., Mountain View Calif. ("JavaBeans Specification").

Framework 28 is associated with a client-adapter 30, which connects framework 28 to external software applications via the network interface means and over communication medium 26. It will be apparent to those of skill in the art that client-adapter 30 provides a software interface between the software and the network interface means on device 22. In a present embodiment, client-adapter 30 is the client component of an adapter determined using the adapter tool provided with the JDMK, and discussed in detail in Chapter 5 of JDMK. However, it will be apparent that other client-adapter means can be used for other types of programming, as will occur to those of skill in the art.

It will be understood by those of skill in the art that framework 28 is a type of registry for registering the existence of objects ($O_1$, $O_2 \ldots O_8$). It will be further understood that objects ($O_1$, $O_2 \ldots O_8$) form at least a portion of at least one software application intended for execution by a user of device 22. In other embodiments, there can be a different number of objects, and/or objects ($O_1, O_2 \ldots O_8$) can be another type of program-language or component architecture, such as ActiveX, COM or CORBA objects, as will occur to those of skill in the art. It will be further understood that a registry or framework 28 can be incorporated into each object ($O_1$, $O_2 \ldots O_8$) thus eliminating the need for a separate framework 28.

Framework 28 also includes a persistent storage registry 31, that is resident in the persistent storage means of device 22, and is used to establish the contents of framework 28 on initialization or start up of device 22. Registry 31 is associated with a registry-manager object that manages the contents of registry 31. In a present embodiment registry 31 is an m-bean repository in accordance with the JDMK and lists objects ($O_1, O_2, \ldots O_8$) within framework 28.

Device 22 also includes a persistent storage repository 33 that is associated with a portion of the persistent storage means of device 22 and can store objects ($O_1, O_2 \ldots O_8$). As shown in FIG. 1, repository 33 has a plurality of storage blocks ($SB_1 \ldots SB_n$), where $SB_1$ contains objects ($O_1$, $O_2 \ldots O_4$), $SB_2$ contains objects ($O_5 \ldots O_8$) and $SB_3 \ldots SB_n$ are empty. It is to be understood that each storage block ($SB_1 \ldots SB_n$) need not contain an identical number of objects, and that the exact size of each storage block ($SB_1 \ldots SB_n$) can be dynamically allocated. As such, storage blocks $SB_3 \ldots SB_n$ can be considered a contiguous block of available storage space. It will be further understood that in other embodiments of the invention, certain temporary objects resident in framework 28 need not be stored in repository 33.

Repository 33 is also associated with a repository-manager object that manages the storage and retrieval of data from the persistent storage means. In a present embodiment of the invention, storage blocks ($SB_1 \ldots SB_n$) are Java Archives ("JAR") and repository 33 is a Java ARchive ("JAR") repository.

Framework 28 also includes a gateway G which in the present embodiment is a managed-bean object or "m-bean", (the specifications for which are discussed in Chapter 3 of JDMK). Once device 22 is initialized, gateway G has unique privileges to interact (via a method call or other suitable means) with and manage the contents of register 31 and repository 33.

Software within server 24 includes an application APP and a gateway managed-object $G_{MO}$, which is created by performing a managed-object generation operation on gateway G. It will be understood that gateway managed-object $G_{MO}$ is a client-bean ("c-bean"), or proxy, shell, wrapper or other suitable representation of gateway G. As gateway managed-object $G_{MO}$ is a representation for gateway G, application APP can transparently access gateway G, through method calls to gateway managed-object $G_{MO}$.

In a present embodiment, the managed-object generation operation is the "mogen" tool provided with the Java Dynamic Management Kit, and discussed in "Generating a C-bean" of Chapter 2 of Sun Microsystems, Java Dynamic Management Kit. It is to be understood, however, that other managed-object generation operations can be used as will occur to those of skill in the art.

Both application APP and gateway managed-object $G_{MO}$ are associated with a server-adapter 36, for connection to external software applications via communication medium 26. The previously-mentioned specifications are applicable to server-adapter 36, which is complementary to client-adapter 30, and collectively server-adapter 36 and client-adapter 30 compose an adapter determined using the adapter tool provided with the JDMK, and discussed in Chapter 5 of JDMK. Similar to client-adapter 30, server-adapter 36 provides a software interface between the software and the network interface means on server 24.

Server 24 also includes four objects ($O_1$, $O_5$, $O_9$, $O_{10}$) which are stored in file storage means 38, and are intended for transfer to device 22 and execution or activation thereon. In a present embodiment objects ($O_1$, $O_5$, $O_9$, $O_{10}$) are all JavaBeans, and objects $O_1$ and $O_5$ in storage means 38 are the same as objects $O_1$ and $O_5$ resident in device 22.

Figure 2:
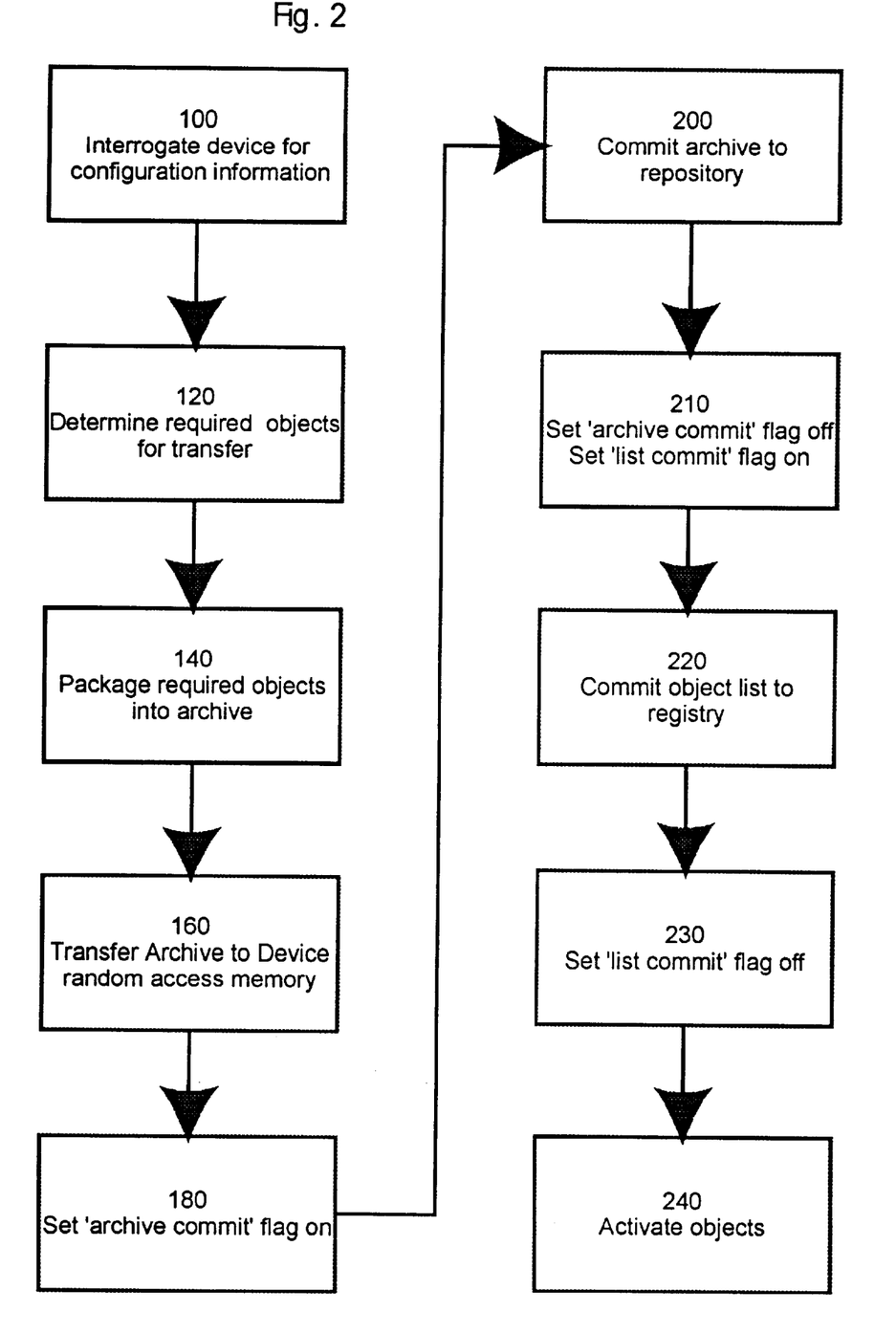
FIG. 2 is a flow-chart of a method for transferring objects between two computers in accordance with an embodiment of the present invention.

A method for transferring objects between server 24 and device 22 will now be discussed with reference to the flowchart of FIG. 2 and system 20. In a present embodiment, the method of FIG. 2 is commenced based on a determination that device 22 requires objects ($O_1$, $O_5$, $O_9$, $O_{10}$) for an application, and that these objects are currently stored in file storage means 38. At step 100, device 22 is interrogated to determine its configuration. In a present embodiment, this is accomplished by application APP which makes a method-call to gateway G via gateway managed-object $G_{MO}$. During this method-call, application APP determines the amount of persistent storage space available on device 22, and a list of objects currently stored in device 22 and/or any other properties of device 22 necessary for a file transfer. Application APP determines that $SB_1$ contains objects ($O_1 \ldots O_4$), $SB_2$ contains objects($O_5 \ldots O_8$) and that storage block $SB_3 \ldots SB_3$ are available for storage.

At step 120, the objects required for transfer are determined. In a present embodiment, step 120 is accomplished by application APP, which compares the configuration data obtained at step 100 with the list of objects needed by device 22. Application APP thus determines that object $O_1$ and object $O_5$ are already resident on device 22 and it is therefore only necessary to transfer object $O_9$ and object $O_{10}$ from server 24 to device 22. Application APP also notes that storage block $SB_3$ is empty and large enough to store object $O_9$ and object $O_{10}$.

It will be apparent that if application APP determined that no objects were required for transfer to device 22, or where there was insufficient storage blocks to store the objects required for transfer, then the method would terminate and could be recommenced from step 100 at a later time, if necessary.

Figure 3:
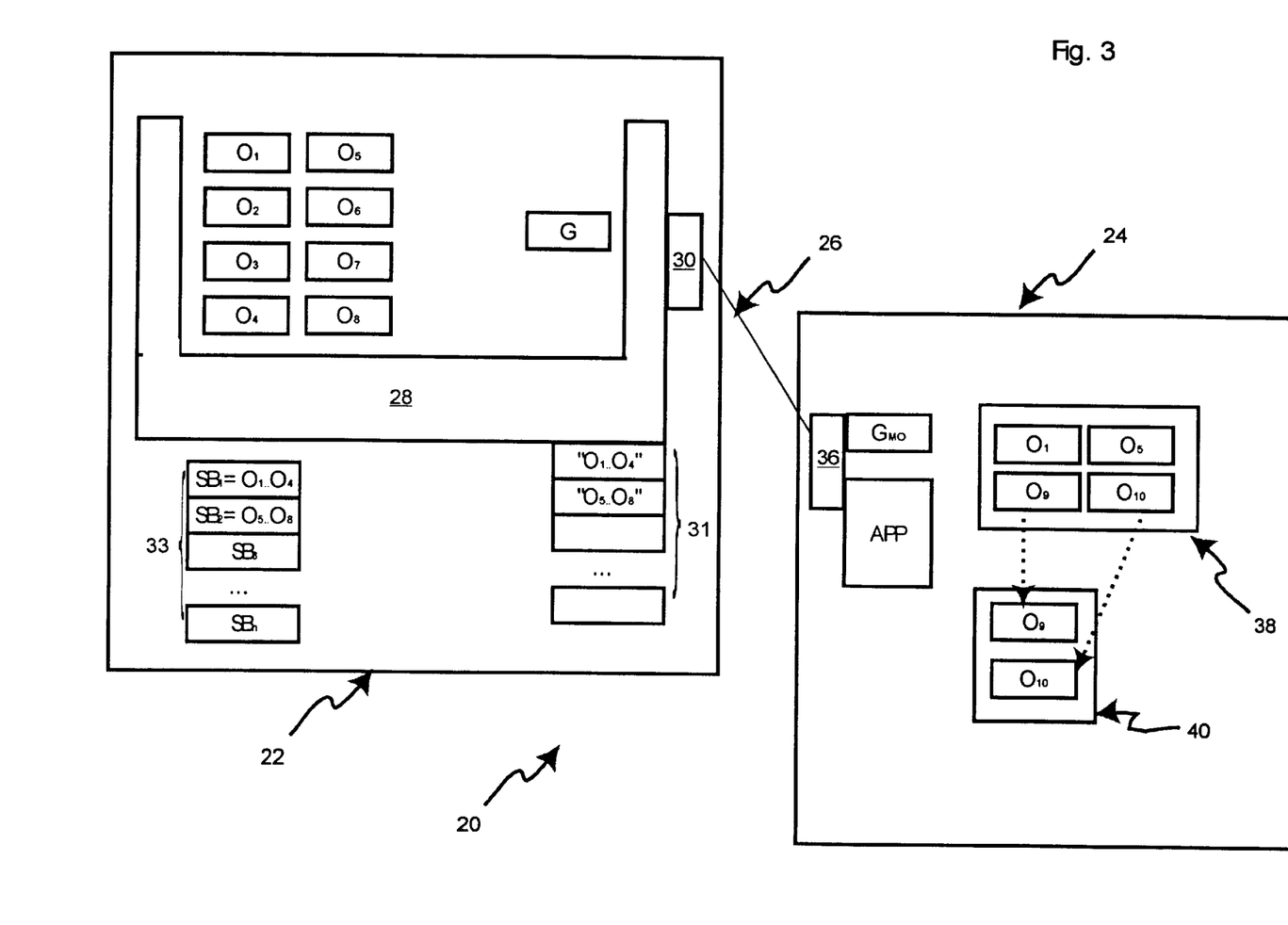
FIG. 3 is a schematic diagram of the system of FIG. 1 showing the performance of a step of the method of FIG. 2.

At step 140, the objects required by device 22 are packaged into an archive in preparation for transfer and specifically, object $O_9$ and object $O_{10}$ are packaged into an archive 40, as shown in FIG. 3. In a present embodiment, archive 40 is a Java Archive ("JAR") and includes a checksum or any other suitable verification means attached thereto.

Figure 4:
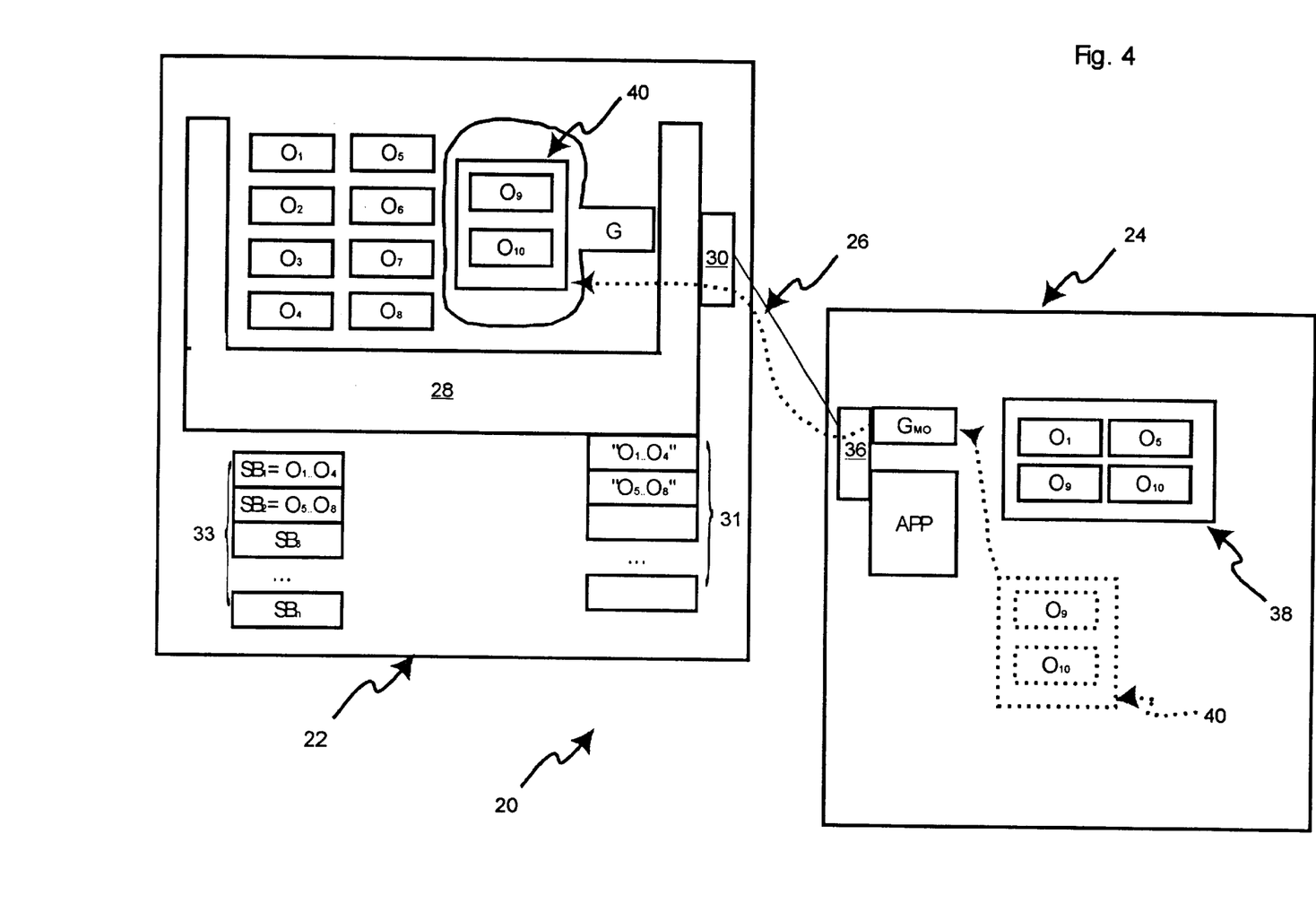
FIG. 4 is a schematic diagram of the system of FIG. 1 showing the performance of a step of the method of FIG. 2.

At step 160, as shown in FIG. 4, archive 40 is transferred from server 24 to the random access memory of device 22 via communication medium 26, as indicated in dashed line. In a present embodiment, the archive 40 is passed as a parameter within a method call to gateway G.

At step 180 an archive-commit flag, which in a present embodiment is present in gateway G, is set 'on'. It will be understood that in other embodiments, the archive-commit flag can be implemented in a variety of different ways. As will be discussed in greater detail below, the archive-commit flag is used during initialization or boot-up to determine whether an archive was being committed when the operation of device 22 was disrupted.

Figure 5:
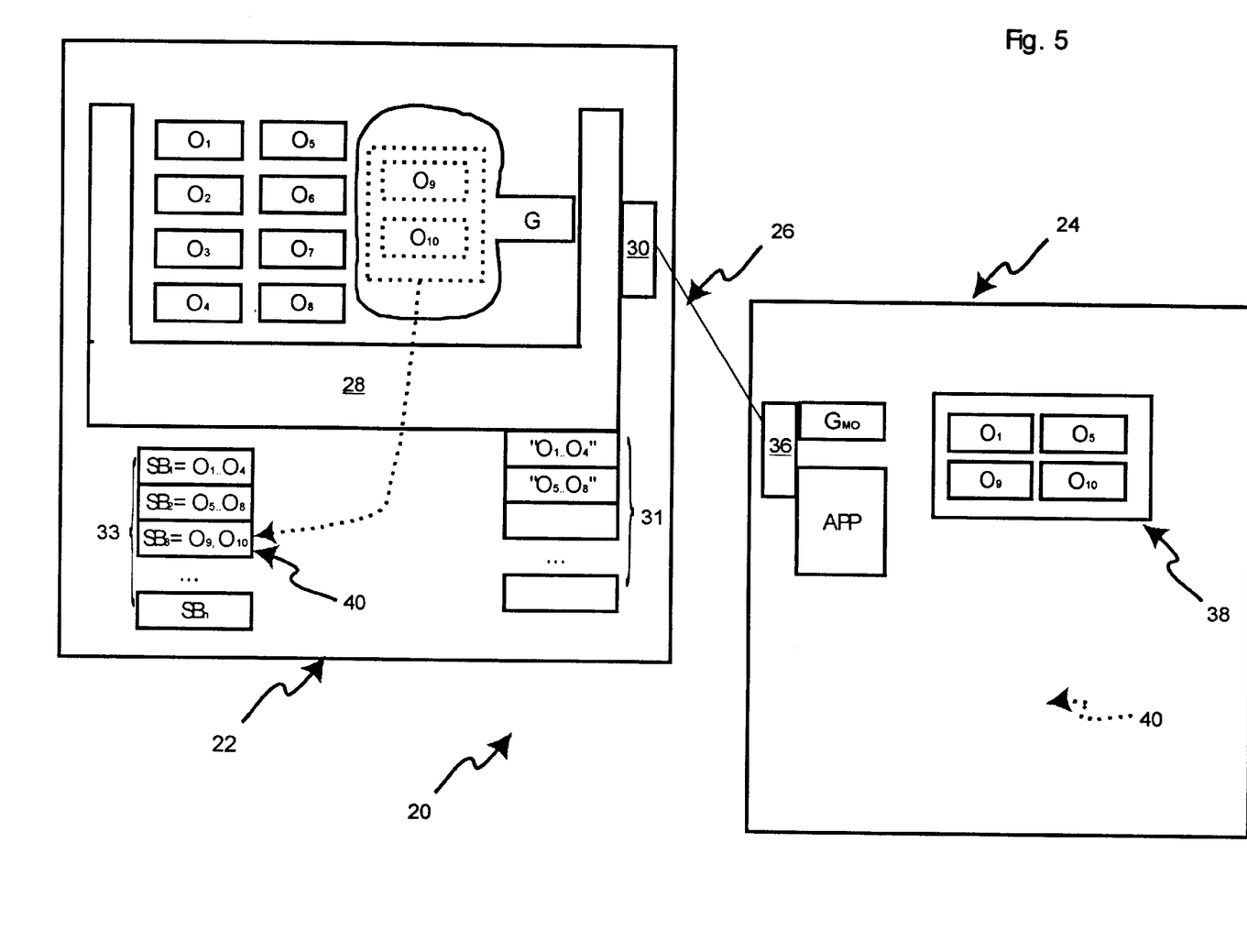
FIG. 5 is a schematic diagram of the system of FIG. 1 showing the performance of a step of the method of FIG. 2.

At step 200, as shown in FIG. 5, gateway G instructs repository 33 to commit archive 40 to persistent storage. Gateway G makes a method call to the repository-manager associated with repository 33 to write archive 40 to persistent storage associated with repository 33. In a present embodiment, the checksum associated with archive 40 is also used to verify the integrity of archive 40 during the storage procedure.

It is to be understood that if device 22 experiences a power failure or otherwise shuts down during step 200, then during a subsequent initialization of device 22, gateway G will determine that its archive-commit flag is 'on', and determine that a power-failure or shut down occurred during step 200. Accordingly, gateway G will query the repository-manager querying as to whether archive 40 was successfully committed to storage. If successful, the method proceeds to step 210. However, if unsuccessful, the repository-manager will free-up any storage blocks being used during step 200 and, once device 22 reestablishes communication with server 22, application APP will then begin at step 100 and re-attempt the file transfer.

Assuming that archive 40 is successfully committed to persistent storage, as shown in FIG. 5, then method of the present embodiment proceeds to step 210 where the archive-commit flag is set 'off', and a list-commit flag is set 'on'. In a present embodiment, the list-commit flag is present in gateway G, and is used by gateway G during initialization or boot-up to determine whether an archive was being committed when the operation of device 22 was disrupted.

Figure 6:
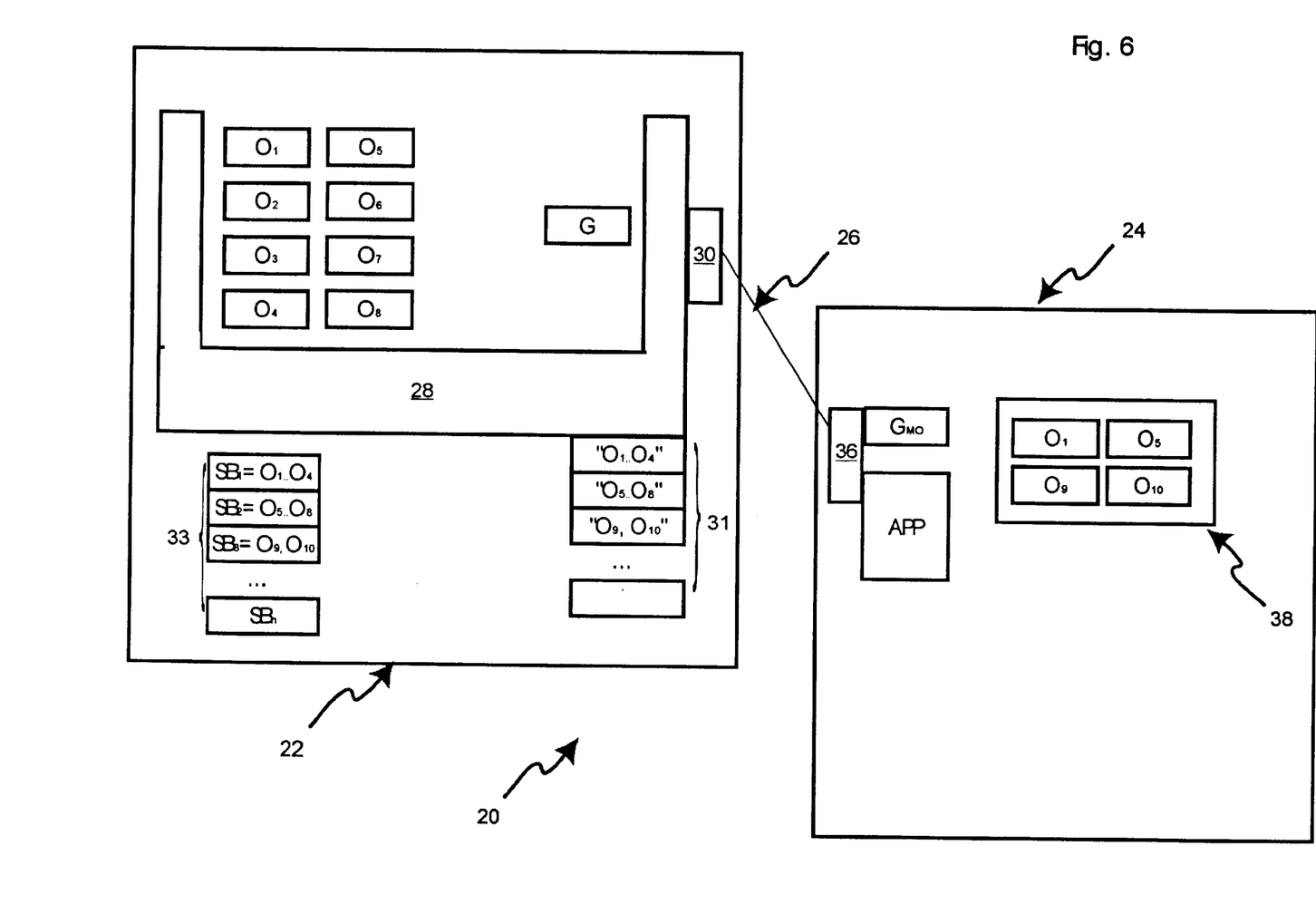
FIG. 6 is a schematic diagram of the system of FIG. 1 showing the performance of a step of the method of FIG. 2.

As indicated in FIG. 6, at step 220 gateway G instructs registry 31 to commit the list of objects within archive 40 to persistent storage. Specifically, gateway G makes a method call to the registry-manager objects associated with registry 31 to list object $O_9$ and object $O_{10}$ in the persistent storage area associated with registry 31. It is to be understood that if the operation of device 22 if device 22 experiences a power failure or otherwise shuts down then during step 220, then during the subsequent initialization of device 22, gateway G will discover that the list-commit flag is 'on', and accordingly determine that step 220 failed. Accordingly, gateway G can commence a recovery operation of step 220 by instructing registry 31 to examine the contents of repository 33 to ascertain the list of objects that should be present in registry 31, and use this information to complete step 220.

However, if the operation of device 22 is not disrupted during step 220, then object $O_9$ and object $O_{10}$ are listed within registry 31 as shown in FIG. 6, and the method of the present embodiment proceeds to step 230.

Figure 7:
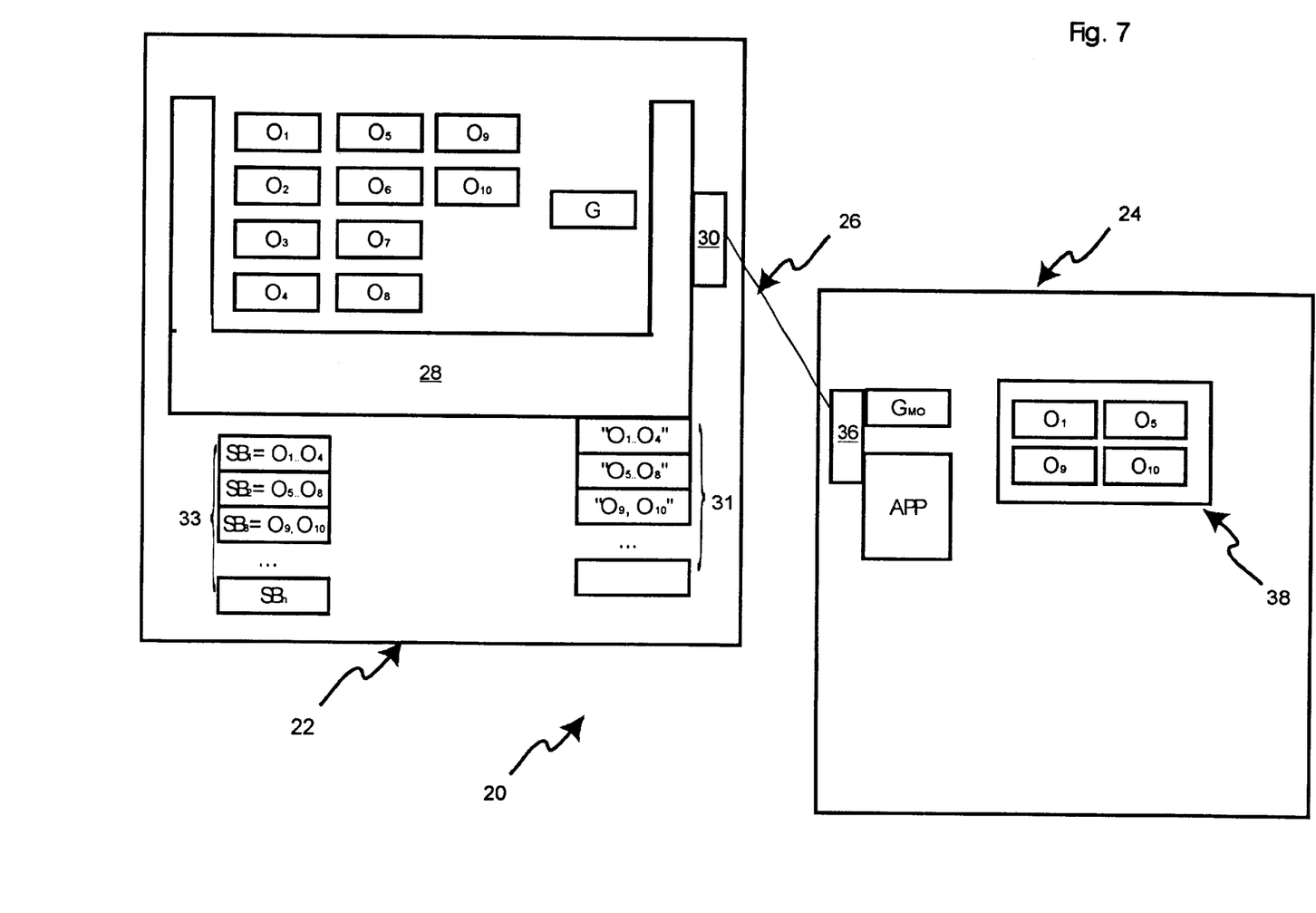
FIG. 7 is a schematic diagram of the system of FIG. 1 showing the performance of a step of the method of FIG. 2.

At step 230, the list-commit flag is set off At step 240, object $O_9$ and object $O_{10}$ are activated by registry 31 which instantiates object $O_9$ and object $O_{10}$ within framework 28, as shown in FIG. 7. Accordingly, object $O_9$ and object $O_{10}$ now become available to applications executing on device 22.

While the embodiments discussed herein are directed to particular implementations of the present invention, it will be apparent that the sub-sets and variations to these embodiments are within the scope of the invention. For example, while the embodiments herein are directed to JavaBean objects, it will be apparent that other types of objects can be implemented in accordance with the teachings of the invention. It is also contemplated that the archive-commit flag and list-commit flags can be implemented in a variety of forms and recovery-means within device 22, in order to provide a robust mechanism to recover from a failed download and/or archive-commit procedure should device 22 lose power during such operations.

The present invention provides a novel method and system transferring objects between computers. The present invention is particularly useful in systems incorporating the Java Dynamic Management Kit, as it provides a means where only the required objects are actually transferred from the server to the device to improve the overall efficiency of the download.

Further, flags in the device can be used to determine whether a file transfer failed during initialization of the device, thereby improving the overall reliability of file transfers and providing an effective means of system recovery. File transfer reliability is further improved by the use of a verification means such as a checksum attached to the archive file before file transfer. This checksum can be used by the device to ensure the overall integrity of the objects when the objects are committed to persistent storage areas within the device. In addition, the invention can increase efficient use of device resources by not loading redundant components on the device.

We claim:

1. A method for transferring at least a portion of a group of objects to a first computer from a second computer, said first computer having a central processing unit, random access memory and a persistent storage means, said first and second computers connected by a communication medium, said method comprising the steps of:

interrogating said first computer for configuration information;

determining required objects for transfer based on an operation that considers, at least in part, said configuration information and said group of objects;

packaging said required objects into an archive;

transferring said archive to said random access memory;

setting an archive-commit flag on;

committing said archive to said persistent storage;

setting said archive commit flag off;

setting a list-commit flag on;

committing a list of said required objects to said persistent storage;

setting said list-commit flag off; and activating said required objects in said random access memory.

2. The method according to claim 1 wherein said objects are JavaBeans beans based on the JavaBeans specification.

3. The method according to claim 1 wherein said archive is a Java ARchive.

4. The method according to claim 1 wherein said archive is committed to a repository area of said persistent storage.

5. The method according to claim 1 wherein said list is committed to a registry area of said persistent storage.

6. A system for transferring at least a portion of a group of objects between computers, comprising:

a first computer having a central processing unit, random access memory, a persistent storage repository for storing archives of objects, a persistent storage registry for storing a list of said objects, and a first network interface means, said first computer operable to execute said objects, and operable to execute a gateway object having privileges to interact with said repository and said register;

a second computer having a second interface means connectable to said first computer via a communication medium, said second computer having a file storage means for storing a group of objects, said second computer being operable to execute an application and a gateway managed object, said gateway managed object being a proxy for said gateway object so that said application can interrogate said gateway object for configuration information of said device and transfer an archive of at least a portion of said group via said gateway managed object to said gateway object, said archive packaged based on an operation that considers, at least in part, said configuration information;

such that when said gateway object receives said archive, said gateway object instructs said repository to commit said archive to said repository and a list of objects in said archive to said registry, said device setting at least one flag during said commission of said archive and said list to allow device recovery upon initialization if said device loses power during said commission.

7. The system according to claim 6 wherein said objects are JavaBeans beans based on the JavaBeans specification.

8. The system according to claim 6 wherein said archive is a Java ARchive.

9. The system according to claim 6 wherein said configuration information includes an inventory of available random access memory on said device.

10. The system according to claim 6 wherein said configuration information includes an inventory of available persistent storage on said device.

11. The system according to claim 6 wherein said configuration information includes a list of objects from said group of objects which are already resident in said device.

12. The system according to claim 6 wherein said gateway managed object is determined using the mogen tool from the Java Dynamic Management Kit.

13. The system according to claim 6 wherein said first computer is a Java-based intelligent device and said second computer is a Java-based network computing server.

14. The system according to claim 6 including a first flag set during said commission of said archive and a second flag set during said commission of said list.

* * * * *